(12) United States Patent
Zhang (10) Patent No.: US 9,659,084 B1
(45) Date of Patent: May 23, 2017

(54) SYSTEM, METHODS, AND USER INTERFACE FOR PRESENTING INFORMATION FROM UNSTRUCTURED DATA

(71) Applicant: Guangsheng Zhang, Palo Alto, CA (US)

(72) Inventor: Guangsheng Zhang, Palo Alto, CA (US)

(*) Notice: Subject to any disclaimer, the term of this patent is extended or adjusted under 35 U.S.C. 154(b) by 379 days.

(21) Appl. No.: 14/222,591

(22) Filed: Mar. 22, 2014

Related U.S. Application Data (60) Provisional application No. 61/805,141, filed on Mar. 25, 2013, provisional application No. 61/809,893, filed on Apr. 9, 2013.

(51) Int. Cl.
  *G06F 17/30* (2006.01)

(52) U.S. Cl.
  CPC ............... *G06F 17/30696* (2013.01)

(58) Field of Classification Search
  CPC ......... G06F 17/30985; G06F 17/30696; G06F 17/30654; G06Q 30/0282; G06Q 50/01; G06Q 50/14; G06Q 50/12
  USPC .......................................................... 707/772
  See application file for complete search history.

(56) References Cited

U.S. PATENT DOCUMENTS

| | | | |
|---|---|---|---|
| 5,963,940 A * | 10/1999 | Liddy | G06F 17/30654 |
| 6,026,388 A * | 2/2000 | Liddy | G06F 17/30654 |
| 7,536,413 B1 * | 5/2009 | Mohan | G06F 17/3071 |
| 8,135,576 B2 * | 3/2012 | Haley | G06F 17/2785 704/257 |
| 8,166,045 B1 * | 4/2012 | Mazumdar | G06F 17/30864 707/713 |
| 8,265,925 B2 * | 9/2012 | Aarskog | G06F 17/271 704/1 |
| 8,311,874 B2 * | 11/2012 | Gupta | G06Q 10/06 705/7.29 |
| 8,370,129 B2 | 2/2013 | Zhang | |
| 8,385,206 B2 * | 2/2013 | Nandagopal | H04L 47/10 370/235 |
| 8,407,217 B1 | 3/2013 | Zhang | |
| 8,601,397 B2 * | 12/2013 | Marcy | G06F 17/30011 715/254 |
| 8,671,280 B2 * | 3/2014 | Yoshioka | G06Q 10/10 705/35 |

(Continued)

*Primary Examiner* — Sheree Brown (57) ABSTRACT

A system, methods, and user interface for extracting information from unstructured data sources and presenting such information in a structured or semi-structured format for better information search and utilization, and can be applied to replace the conventional methods of displaying search results. The methods identify terms representing topics and related comments in various types of text contents including documents and Web pages, and extract such terms and present them in a form of a topic-comment or object-properties hierarchy, including a heading+list format and heading+cloud or group format. Methods and interface object are provided to make a file object a non-terminal node in a computer file system, with information extracted from the file content displayed as deeper levels of the file system hierarchy. Methods for displaying information extracted from unstructured document contents in terms of class-members and topic-attributes are also disclosed.

12 Claims, 10 Drawing Sheets

(56) References Cited

U.S. PATENT DOCUMENTS

| | | | |
|---|---|---|---|
| 2001/0018698 A1* | 8/2001 | Uchino | G06F 17/3061 715/277 |
| 2002/0138528 A1* | 9/2002 | Gong | G06F 17/27 715/254 |
| 2004/0044952 A1* | 3/2004 | Jiang | G06F 17/30616 715/256 |
| 2004/0107088 A1* | 6/2004 | Budzinski | G06F 17/27 704/10 |
| 2004/0153451 A1* | 8/2004 | Phillips | G06F 17/30876 |
| 2004/0221235 A1* | 11/2004 | Marchisio | G06F 17/271 715/261 |
| 2005/0108001 A1* | 5/2005 | Aarskog | G06F 17/271 704/10 |
| 2006/0059135 A1* | 3/2006 | Palmon | G06F 17/30286 |
| 2006/0106793 A1* | 5/2006 | Liang | G06F 17/30654 |
| 2006/0253438 A1* | 11/2006 | Ren | G06F 17/30616 |
| 2007/0067157 A1* | 3/2007 | Kaku | G06F 17/2775 704/10 |
| 2007/0294614 A1* | 12/2007 | Jacquin | G06F 17/2247 715/230 |
| 2008/0010249 A1* | 1/2008 | Curtis | G06F 17/30705 |
| 2008/0097748 A1* | 4/2008 | Haley | G06F 17/2785 704/9 |
| 2008/0177640 A1* | 7/2008 | Gokturk | G06Q 30/02 705/26.62 |
| 2009/0070099 A1* | 3/2009 | Anisimovich | G06F 17/2755 704/5 |
| 2009/0089277 A1* | 4/2009 | Cheslow | G06F 17/30401 |
| 2009/0144609 A1* | 6/2009 | Liang | G06F 17/21 715/230 |
| 2009/0197619 A1* | 8/2009 | Colligan | G06Q 30/02 455/456.3 |
| 2009/0253112 A1* | 10/2009 | Cao | G06Q 10/10 434/322 |
| 2009/0254334 A1* | 10/2009 | Miyahira | G06F 17/273 704/7 |
| 2011/0202886 A1* | 8/2011 | Deolalikar | G06F 17/30707 715/853 |
| 2012/0072859 A1* | 3/2012 | Wang | G06K 9/00442 715/764 |
| 2013/0054595 A1* | 2/2013 | Isaev | G06F 17/3012 707/736 |

* cited by examiner

Major topics:

Room ← 210 is good .....................................Link 1 ← 225
    fantastic...................................Link 2, Link 3
    not so great ............................Link 4   ← 215
    not good for the price ............Link 5
    very clean.................................Link 1, Link 2
    ......see more....

Bathroom ← 230 spacious ..................................Link 1
    amazing tub..............................Link 3
    with a nice deep tub.................Link 2, Link 4   ← 235
    luxurious ..................................Link 5
    ......see more.....

Bed ← 240

................

More topics....

Figure 3A

```
                    Trending Now
              .........
              5. ......
310 ─
              6. Matt Lauer ABC

320 ─         Nearly left Today show last year
              was ready to jump to ABC
              on the brink of defecting to rival network ABC
              ......

```
              .........
350 ─
           Matt Lauer ABC
360 ─          Matt Lauer nearly left Today Show last year
               Matt Lauer was ready to jump to ABC
               Matt Lauer was on the brink of defecting to rival network ABC
               ......
370 ─
           Obama
380 ─          President Obama visited Hawaii yesterday....
               Obama signed an executive order to ....
               ......
           ........
```

| Name | class/category |
|---|---|
| Doc 1 | marketing |
| Doc 2 | finance |
| Doc 3 | engineering |
| ...... | |

Category: Marketing

Documents:
        Doc 10
        Doc 20
        Doc 30

Category: Finance

Documents:
        Doc 15
        Doc 25
        Doc 35

| Name | overall sentiment |
|---|---|
| Doc 1 | positive |
| Doc 2 | negative |
| Doc 3 | neutral |
| ...... | |

Sentiment: Positive

Documents:
        Doc 10
        Doc 20
        Doc 30

Sentiment : negative

Documents:
        Doc 15
        Doc 25
        Doc 35
......

SYSTEM, METHODS, AND USER INTERFACE FOR PRESENTING INFORMATION FROM UNSTRUCTURED DATA

CROSS REFERENCES TO RELATED APPLICATIONS

The present application claims priority to U.S. Provisional Patent Application 61/805,141 entitled "System, Methods, and User Interface for Presenting Information Based on Document Contents" filed on Mar. 25, 2013, the disclosures of which are incorporated herein by reference.

BACKGROUND OF THE INVENTION

Conventional methods of finding needed information have been mainly through search engines for unstructured data, and database queries for structured data. A problem with these conventional methods is that the user needs to know how to formulate a good query. Common search engines require the user to come up with pertinent keywords, while the engine may often return a long list of results that the user needs to sift through.

However, there are often times when the user may not know what exact keywords to use to search for the information they are looking for, or does not know or does not remember what exact keywords are contained in documents that the user wants to search for. In such cases, finding the needed information can be difficult and time-consuming.

Furthermore, conventional search engines display search results as links to the documents, together with a brief excerpt from the original documents showing the part of the content in the linked documents containing a keyword in the query. An excerpt like that helps the user to determine whether the linked document is relevant to the intended search or not; however, users need to follow the link to open the document and read through the document to locate the specific information being sought. Often, users may only need a quick answer to a question, or a brief overview of what is being said about a topic that the user is querying. In such cases, reading though the entire document to find the relevant information is inefficient.

More effective ways of organizing and presenting information contained in unstructured text contents are needed.

SUMMARY OF THE INVENTION

The present invention provides system, methods, and user interface for novel ways of presenting information extracted from document contents as unstructured data sources.

In a general aspect, various types of documents, or text contents in general, are analyzed, and important terms that can represent the topics or concepts or other information conveyed in the documents are identified, based on various attributes associated with the terms including grammatical, semantic, positional, and frequency attributes.

The methods then identify the relationships between terms in a document in terms of topic-comment, or object-properties relationships, and displaying such information in a hierarchical format.

In one embodiment, the topic term is displayed in the form of a heading, and the comment terms are displayed as items in a list subordinate to the heading, representing information about the topic in a hierarchical format.

In another embodiment, the topic-comment hierarchy is displayed in a cloud or group format.

In another embodiment, the topic-comment hierarchy is displayed when a user acts on the topic term, or acts on a document object in a user interface.

In another embodiment, user interface objects are provided to make a file object in the conventional file system hierarchy a non-terminal node, and integrate the topic-comment hierarchy into the file system.

In another embodiment, comment terms are assigned importance scores and are displayed in different visual effects based on the scores.

In another embodiment, the topic-comments hierarchy is extended to include the class-members relationships identified in the document contents, with class name as a semantic attributes, and terms representing objects associated with the semantic attribute as members of the class.

In another embodiment, the topic-comments hierarchy is extended to include the topic-attributes relationships identified in the document contents, with the topic term representing an object or concept, and terms representing names or descriptions of various semantic attributes or attribute values associated with the topic term.

The examples are mainly based on text objects such as documents or Web pages or emails, however, it should be understood that the principles and methods can also apply to other types of data.

BRIEF DESCRIPTION OF FIGURES

The following drawings, which are incorporated in and form a part of the specification, illustrate embodiments of the present invention and, together with the description, serve to explain the principles of the invention.

DETAILED DESCRIPTION OF THE INVENTION

The present invention provides systems, methods, and user interface for facilitating the process of automatically analyzing the content of the documents, extracting terms or sentences or paragraphs that are the most representative of the information carried in the document content, and presenting such information in a hierarchical format as a semi-structured representation of the information contained in the document content.

The system, methods, and user interface of the present invention can be implemented on a variety of computing devices or network systems.

Figure 1:
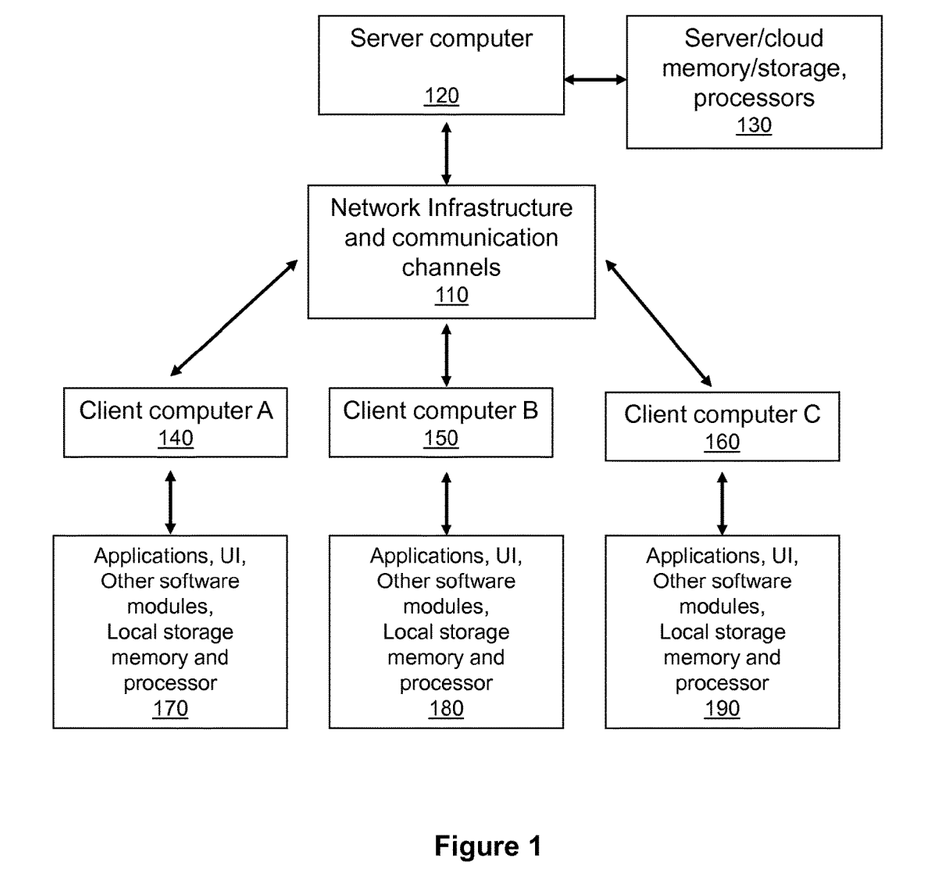
FIG. 1 illustrates the components of a computing system on which the present invention can be implemented.

FIG. 1 is a diagram illustrating a system in the form of a computer network comprising servers, client computers, and related components, where the electronic communications such as sending documents or search queries and receiving search results are carried out, and where the present invention is implemented.

In FIG. 1, one or more of the client computing devices (140), (150), and (160), etc., are connected with each other and with one or more server (120) computing devices through a network infrastructure and communication channels (110). The server computing device (120) is equipped with its own hardware processors and memory modules, and local or cloud-based storage media (130) which can store the various text contents or documents or search indexes or databases, as well as software modules for processing the information contained in the contents. The client computing devices can have their own local storage, as well as memory modules and processors, coupled with various software modules including Web browsers, user interfaces, file systems, and file management tools, and text analysis software modules (170), (180), and (190), etc. The server and the client computing devices can be a fixed-location device, a cloud-based device, or a mobile or hand-held device. A user interface device includes devices such as a desktop, laptop, a mobile device with a screen, a television, or any other device with a display.

Search queries can be sent and received by the client computers and displayed in the user interface for composing and viewing, or can also be processed on a client computer. Users of the client computing devices can launch software applications to manage local or cloud-based documents, perform searches and view results on the user interface.

In the present disclosure, the definition of documents can include commonly perceived electronic file objects such as personal or company documents of various formats, and other types of documents including web pages, emails, text messages, blogs, articles, books, social network comments, product/service reviews, as well as non-text file objects such as audio/image/video files and their text transcripts or metadata.

In the following description, a document, or a text content in general, can either be in an opened state, in which its content is in a viewable state, or in a closed state, in which the document is represented as a file object on a computing device, with or without a visible icon or name associated with the file object, whenever applicable.

Furthermore, the term "document" and "text content" can be interchangeably used; and the word "term" and "terms" may also be interchangeably used when referring to either a single instance or multiple instances of words or phrases.

Conventional search engines display search results as links to the documents, together with a brief excerpt from the original documents showing the part of the content in the linked documents containing a keyword in the query.

For example, on the home page of certain Internet portals such as Yahoo.com, a number of popular search results are listed as "Trending Now". Acting on an entry in the list opens a search result page containing links to the Web pages that have contents about the topic. This is an example of the conventional way of displaying certain information.

Some other search engines can provide a well-formatted summary of the content as an answer to the query.

In contrast, the present invention provides a novel method of extracting comments on a given topic from multiple sources such as multiple Web pages, reviews, or other documents, or extracting terms that are identified as carrying related information about the topic, and displaying such comments in relation to the topic in a format like a tree structure, or a hierarchical structure for easy information utilization.

Figure 2:
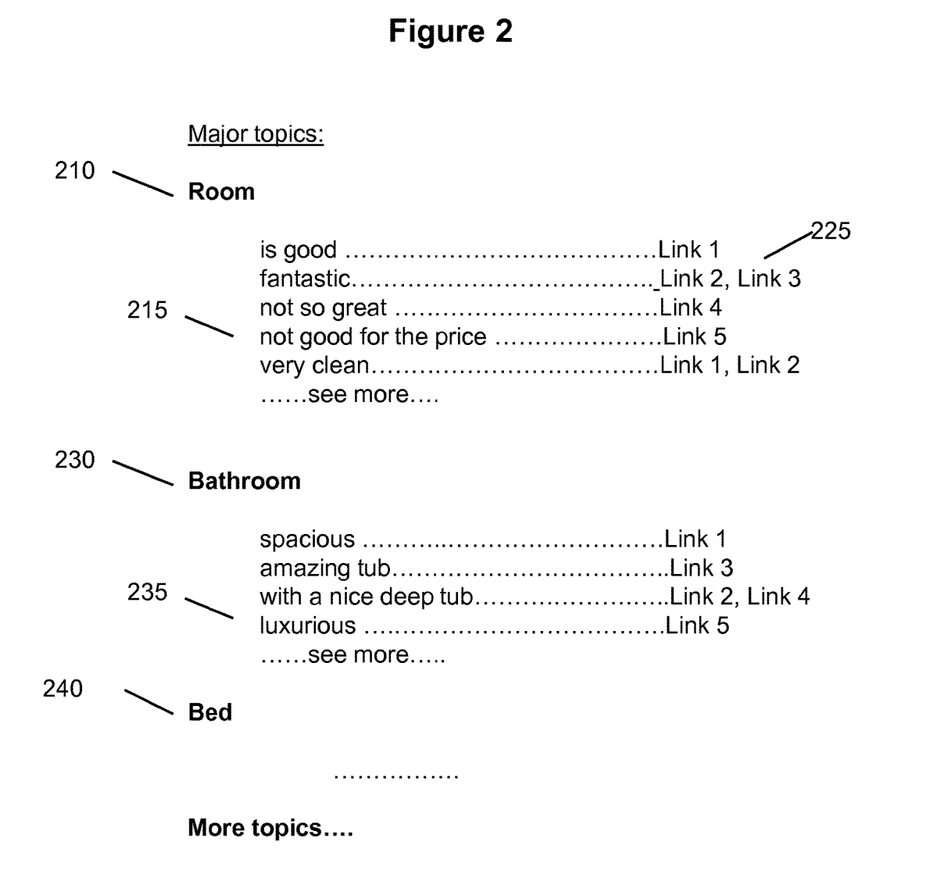
FIG. 2 is an example of displaying comments under a topic as a heading.

FIG. 2 is an example of the topic-comment hierarchy based on information extracted from user-reviews on a hotel. Multiple topics and comments can be displayed in the same way as additional levels or nodes in the tree structure.

In FIG. 2, exemplar comment terms (215, 235) are extracted from one or more user reviews on a hotel. Such user reviews are the source documents as unstructured data. Topics or topic terms (210, 230, and 240) are either identified or pre-defined. Methods for identifying such terms as topics or as comments on the topic, and then extracting such terms for display in such a tree format are disclosed in the U.S. patent application Ser. No. 13/707,940, entitled "Automated Topic Discovery in Documents and Content Categorization", filed on Dec. 7, 2012, and also in U.S. patent application Ser. No. 13/709,827 entitled "System, Methods and User Interface for Discovering and Presenting Information in Text Content", filed on Dec. 10, 2012. The disclosures of these applications are herein incorporated by reference.

In the referenced disclosures, various types of grammatical, semantic and contextual analyses are performed on the text content, and grammatical or semantic attributes associated with each term in the text content are identified, and terms with different attributes are treated in different ways when determining their importance in representing the information contained in the text content.

The methods in the referenced disclosure are based on a novel theoretical model called Object Properties Association Model for linguistic information representation and linguistic information quantification. The methods identify a subject and a predicate in a sentence, and treat the term associated with the grammatical role of subject of the sentence as representing an object or concept or topic, and treat the term associated with the grammatical role of predicate or part of the predicate of the sentence as representing a property or a piece of information of the object, or a comment on the topic. In some embodiments, the predicate of a sentence is defined as the portion of the sentence that does not include the subject of the sentence.

The methods further include the grammatical relationships between the terms in a complex phrase comprising a head term and one or more modifier terms, and treat the head term as representing an object or concept or topic, and the modifier term as representing a property or a piece of information of the object, or a comment on the topic represented by the head term. For example, in the complex phrase "digital camera", the head term "camera" can represent an object or concept or topic, and the modifier "digital" can represent a property of the object, or a comment on the topic.

This type of relationship between the head term and a modifier term in a complex phrase can be applied no matter whether the complex phrase is in the subject of the sentence, or in the predicate of the sentence, and can be extended to various types of phrases, for the purpose of identifying a topic or an object or a concept, and a comment on the topic, or a property of the object. In some embodiments, the role of the head term and the modifier term can be interchangeable in representing the topic-comment or object-property relationships between the terms in a complex phrase.

In some embodiments, the comment term can be a part of the sentence that includes the head term or the modifier term. For example, if the topic term is "digital camera", the comment term can be "produces digital cameras". In some other embodiments the comment term can be the entire sentence that includes the subject of the sentence as well. For example, if the topic term is "digital camera", the comment term can be the entire sentence such as "digital cameras are more affordable these days", which include the subject term of "digital camera(s)".

The topic-comment or object-property relationship is treated in both the referenced and present disclosures as a structured or semi-structured representation of information identified and extracted from the text content, and can be displayed in a user interface in a corresponding format.

In the following description, the words of "comment" and "comment term" are interchangeably used, and the words of "topic" or "topic term" are also interchangeably used. Furthermore, as in the referenced disclosures, the relationships between a topic and a comment can also be called, in a more general sense, the relationships between an object and its properties. In some other cases, they can also be called the relationships between a property and its values. The methods of displaying information extracted from user generated content in the format of showing topic-comment, or object-property, or property-value relationships can generally apply to other cases in addition to the specific examples described below.

In one embodiment of the present invention, this topic-comment display format is further applied to any word or phrase that is used as a topic or heading and displayed in a user interface, such that, when the user acts on the word or phrase, such as moving a pointing device over the term, clicking, or touching on the term, one or more comments or comment terms related to the topic or topic term can be displayed to the user, without the user further needing to open the individual source pages, such as multiple web pages. In some embodiments, in addition to allowing the user to act on a word or phrase, the user action can also be performed on a user interface object such as a button or an icon associated with the word or phrase for the same functionality. The user action on the term can also include other types of actions such as an action by a voice command containing the transcript of the term, or by a visual focus on the term detected by an eye-tracking device.

Figure 3A:
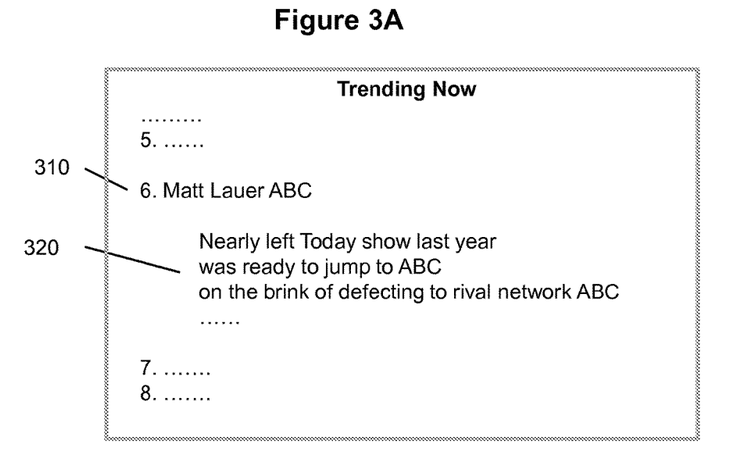
FIG. 3A is an example of displaying comments extracted from multiple Web pages under a topic.

FIG. 3A illustrates an example of this embodiment when applied to the exemplar "Trending Now" section on the home page of Yahoo.com displayed as of this writing, or a second page after clicking on a topic. In FIG. 3A, acting on one of the topic terms such as "Matt Lauer ABC" (310) will display a list of comments (320) extracted from the multiple source web pages, instead of the conventional method of displaying a list of links to the individual source pages.

An advantage of the present method is that if a user only wants to have an overview of what is being said about the topic, the user does not need to follow the links to each individual document to find out the specific information, thus providing the user with a convenient choice of getting the needed information, without spending unnecessary time and efforts in digging for such information.

Figure 3B:
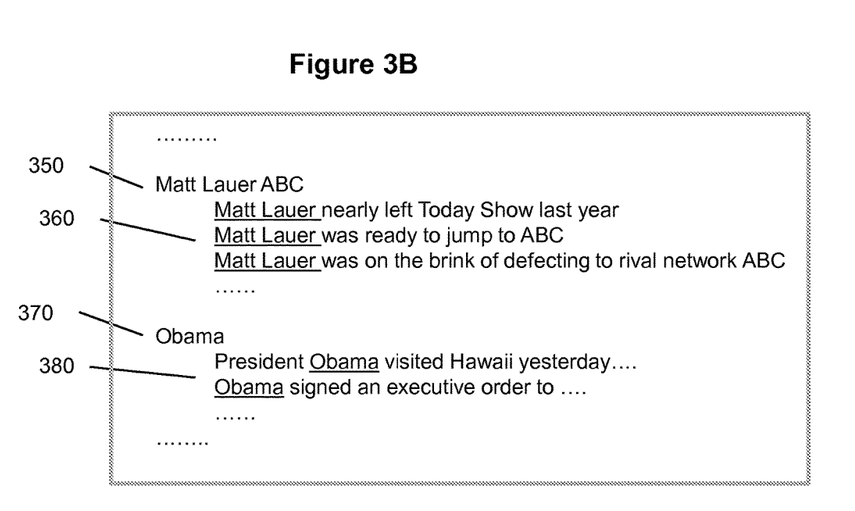
FIG. 3B is an example of displaying multiple topics with multiple comments extracted from multiple Web pages.

In some embodiments, a comment term can include the sentence that contains the topic term. FIG. 3B is an example that shows the comment terms being sentences that include the topic term, in which the topic terms (350, 370) are the grammatical subjects of the sentences (360, 380).

In some embodiments, the comment terms or comment sentences are assigned importance scores using the methods in the referenced disclosures, such as based on the number of sentences the comment terms occurs with the topic term, or the specific grammatical relationship between the topic term and the comment term. And when displayed under the topic term, the comment terms can be ranked based on their importance scores.

In some embodiments, the topic-comments examples in FIGS. 3A and 3B can be used as a summary of the text contents, especially, when multiple topics are extracted and displayed, such that when the user clicks on a specific topic, respective comments or sentences can be displayed in a similar format as a topic-based summary of the source text content.

FIGS. 3A and 3B are only examples of the application of the present invention. When the topic-comment relations can be identified using the methods in the present and the referenced disclosures, any terms in any document such as a file or an email, or a text message or a social media comment, etc., can be treated as a topic term, and related comments can be extracted and displayed in connection with the topic term.

Figure 4A:
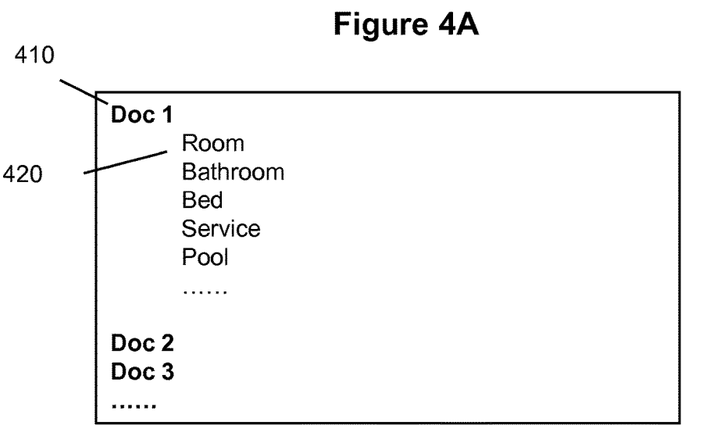
FIGS. 4A and 4B illustrate examples of displaying topic terms and comments under a topic in a user interface of a file management tool.
Figure 4B:
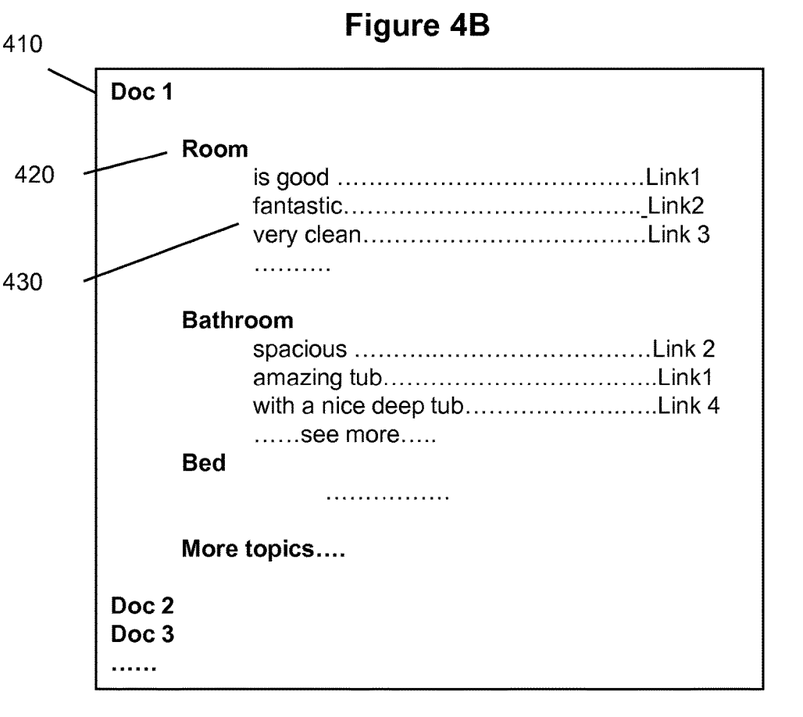

FIGS. 4A and 4B illustrate a user interface of a file management tool, such as the Windows Explorer that comes with the Windows Operating System. In FIG. 4A, for a given document (410) of which an icon or name is displayed in the user interface, a list of automatically extracted terms or keywords 420 can be displayed as topic terms with or without the user acting on the icon or name of the document. Such terms can represent the topics in the document. In FIG. 4B, in addition to the keywords as topic terms, comments (430) related to the terms in 420 can further be displayed to the user.

When such a function is enabled using the methods of the present and the referenced disclosures, users can effectively access information contained in the document in an organized way, without the need to open the document and then spend time to locate such information.

In some embodiments, as described above, term importance scores are calculated for the comment terms, and only the terms with a score above a threshold are selected for display. The methods for calculating the term importance score can be based on the grammatical or semantic attributes associated with the terms, as described in the referenced disclosures. For example, a different weighting co-efficient can be assigned to a term based on the parts of speech of the term, such as whether the term is a noun or a verb or an adjective, or based on the grammatical roles of the term such as whether the term is a head or modifier in a phrase, etc., or based on the frequency of the topic term or a term occurring in the context of the topic term.

When term importance scores are calculated, the comment terms can be displayed in different visual effects based on the term importance scores. For example, when displayed in a list format under the heading of the topic term, the comment terms can be ranked based on their term importance score.

When displayed in a group or cloud format, different size, color or other character styles or annotations can be used to show additional information about the comment terms in accordance with their term importance scores.

Displaying Comments Related to a Topic in a Cloud or Group Format

In addition to gathering the topic-comment data, and displaying in a tree or hierarchical format, in some embodiments, a topic can have multiple comments or terms that carry related information; and some of them can be repetitive. For example, given a topic term such as "Health Care", numerous comments or terms carrying information related to the topic can be identified in multiple document sources such as Web pages or social network comments or blogs. Some people may say that "the cost of health care is increasing too fast"; and other may say that "Health care is a complicated issue" or "the quality of health care does not match the cost", etc. Using the methods described above and in the referenced disclosures, comments such as "a complicated issue", "cost increasing too fast", or "quality does not match the cost", etc., can be identified and extracted and displayed under the topic of "Health Care".

In some cases, multiple persons may have expressed the same comment, or certain comments can have a different frequency of occurrence than others, or from sources that are considered more important or more trustworthy than others. In such cases, each comment can be assigned a weight reflecting its importance or prominence, which can be based on the frequency of occurrence, or types of sources, etc. And in addition to displaying such comments in a tree or hierarchical format as described above, these comments can be displayed in a word-cloud format, or a group format, in which the size, position, orientation, or color or character style, etc, can be different for different comment terms, based on their importance measure.

Conventional word-cloud display is usually based on term frequency only, and does not identify nor indicate which terms are comments related to a certain topic, based on various grammatical or semantic or contextual relationships between the topic term and the comment terms in the source text. In the present invention, such relationships are first identified, and terms are extracted and then grouped together under a relevant topic; and then, in addition to displaying such topic and comment terms in a tree or hierarchical format, the comments can be displayed in a word-cloud or group format, with an indication that these terms are comments related to a given topic. This type of display can provide more effective visual clues for information digestion in certain cases.

Furthermore, each comment term can be linked to the sources in the original text, and users can easily follow the link to get more detailed information related to such comments.

Figure 5:
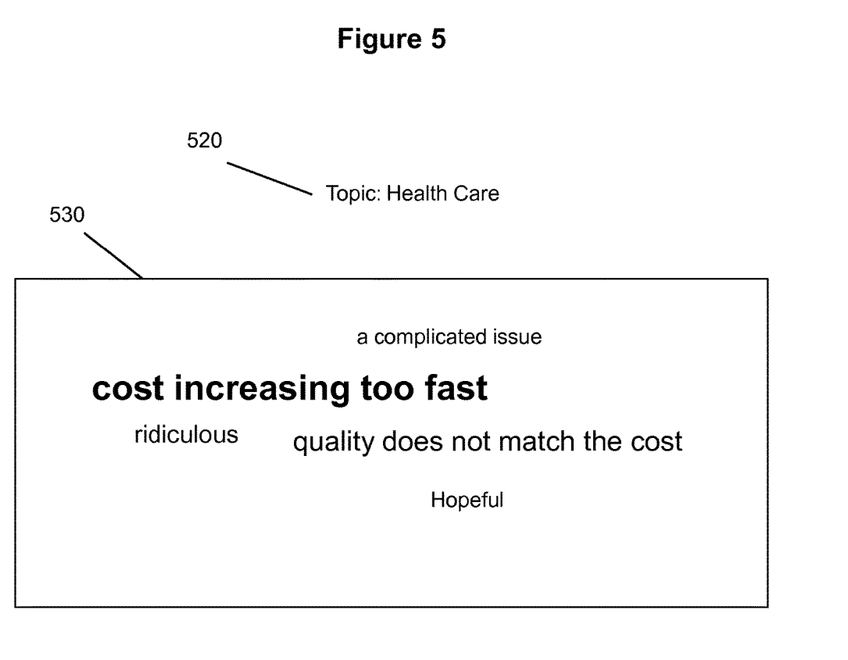
FIG. 5 is an example of displaying topic and comment terms in a word-cloud format.

FIG. 5 is an illustration of such a display format. In FIG. 5, a topic of "Health Care" (520) is first determined, and then the comments are identified, and their weights are determined based on the factors described above, and the terms are extracted for display in such a format (530).

User Interface Objects for Expanding the Display Area

In addition to the above embodiments, the present invention provides more methods and user interface objects to make information in a document more accessible to users.

In conventional user interfaces of various file management tools, files are stored in folders or directories, and folders can have a hierarchical structure, with each folder or sub-folder being a node on a certain level of the structure. In such a structure, an individual file or document is treated as a leaf node, or a terminal node on a given level of the folder structure where the file is located, and such terminal node does not have any more branches underneath, which is intuitive and logical with conventional approaches, which do not further look into the contents of the file or document in a structured way. However, in the present invention, a file or a document as a terminal node in the conventional approach can be further expanded to display important content extracted from the document.

In one embodiment of the present invention, a user interface object is provided and attached to the name or icon of the file or document in the file management tool's user interface, and when the user acts on such a user interface object, a display area can be made available for presenting information about the content of the document.

Figure 6A:
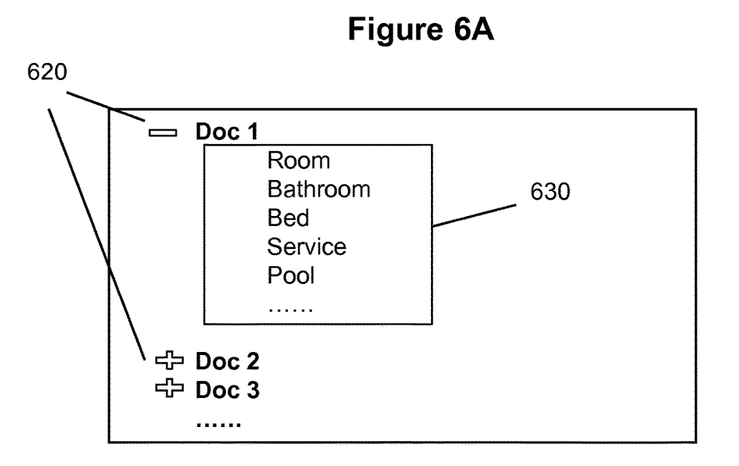
FIGS. 6A and 6B are exemplar cases in which a user interface object is attached to a file object for displaying the topic and comment terms, making the file object a non-terminal node in a tree structure.
Figure 6B:
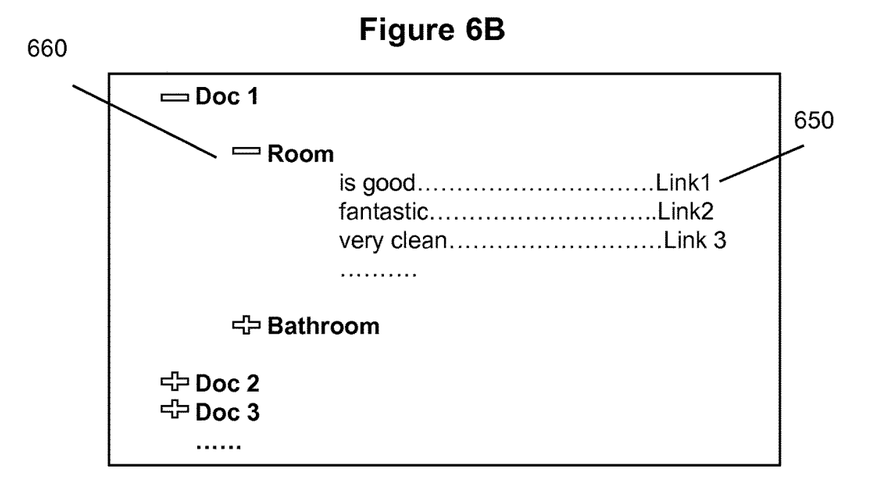

FIGS. 6A and 6B illustrate an exemplar case in which a user interface object 620 is attached to the icon or name of a file in a folder. When a user acts on the object, a display area (630) can be presented to the user, with information about the content of the file, such as terms representing topics in the file, or a summary of the file content. Furthermore, 6B also illustrates that links can be provided such that when the user acts on a word or phrase (650), the user can be taken to the specific part of the file or document related to the term.

FIG. 6B further illustrates that the user interface object (660) can be applied to terms in deeper levels of the data structure being displayed.

In some embodiments, the content being displayed in such an area (630) can be a summary of the document, or other information related to the document, and can be displayed in various formats, including the topic-comment or tree or hierarchical format exemplified in FIG. 6B.

In some embodiments, the user interface object can be omitted, and the important information such as the topic/comment terms extracted from the document can be displayed to the user without the user acting on a user interface object, such as the one illustrated in FIGS. 4A and 4B.

In addition to displaying a list of terms, the display area connected to the icon or name of the document can be used to display a structured information unit such as the topic-comment hierarchical format as illustrated above with FIG. 4B, even when there is only one topic-comment pair in the tree structure. Furthermore, such a topic-comment pair can be manually created or edited in the display area for customized use.

Figure 7A:
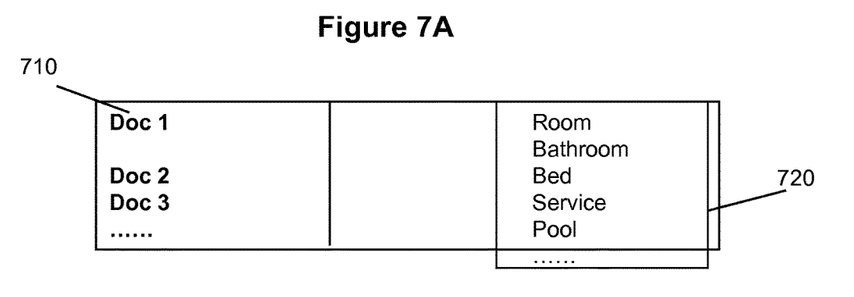
FIGS. 7A and 7B illustrate exemplar cases of displaying topic-comment pair in different display areas.
Figure 7B:
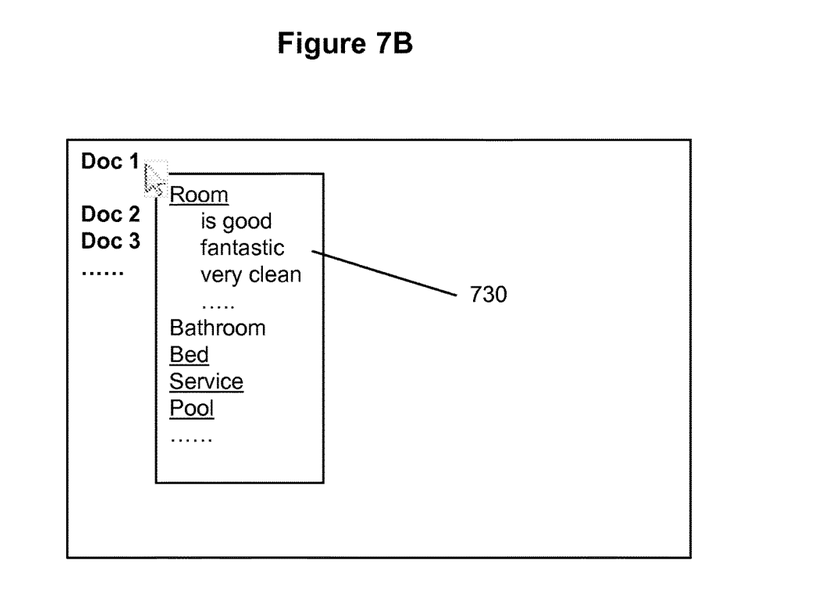

Furthermore, in addition to displaying such a topic-comment pair or a summary in the special display area that is directly connected to the icon or name of the document or the file object, the topic-comment pair or hierarchy can also be displayed in an area separated from the icon or name of the document, such as being displayed in a separate window for preview, or in a popup window when the user acts on the icon or name of the document. FIGS. 7A and 7B illustrate an exemplar case of displaying such topic-comment pair or hierarchy in different display areas. In FIG. 7A, a separate window 720 is provided for such display when the user acts on the document object (710). And in FIG. 7B, a popup window commonly known as an "infotip" window (730) can be used for displaying the topic-comment pair or a topic list.

As illustrated above, in certain case, links can be provided to the location in the document content where the topic or comment terms are contained, such that the user can have quick access to the source without reading through the entire document or performing a search.

As described above, the topic terms or keywords and the relationships between the topic terms and comment terms can be identified using the methods disclosed in the referenced disclosures, such as based on the grammatical, semantic, contextual, positional, and frequency attributes associated with the terms, which are incorporated herein by reference.

The methods can also apply to other types of documents, such as web pages, emails, and other text objects that are not necessarily in a computer file system as illustrated above.

Displaying Information about Attribute-Instances or Class-Members Relationships

In addition to the topic terms displayed in a list format, and topic-comment pairs displayed in the tree or hierarchical format showing relationships between the topic and comments, and in a cloud format, the present invention provides more methods for displaying more relevant information about the content of a document in an organized way for easy information access and utilization.

In some embodiments, the present invention identifies a predefined semantic attribute associated with one or more terms in the source text, and extracts terms that carry the semantic attribute, and displays such terms in connection with the name or description of the semantic attribute.

For example, a predefined semantic attribute can be "drug name", or "company name", or "phone number", or "person name", etc. Using a linguistic analysis method, including a dictionary lookup method, or a pattern analysis method, many terms carrying the predefined semantic attribute can be identified in the source text, and can be extracted and grouped under the name of the semantic attribute.

Figure 8A:
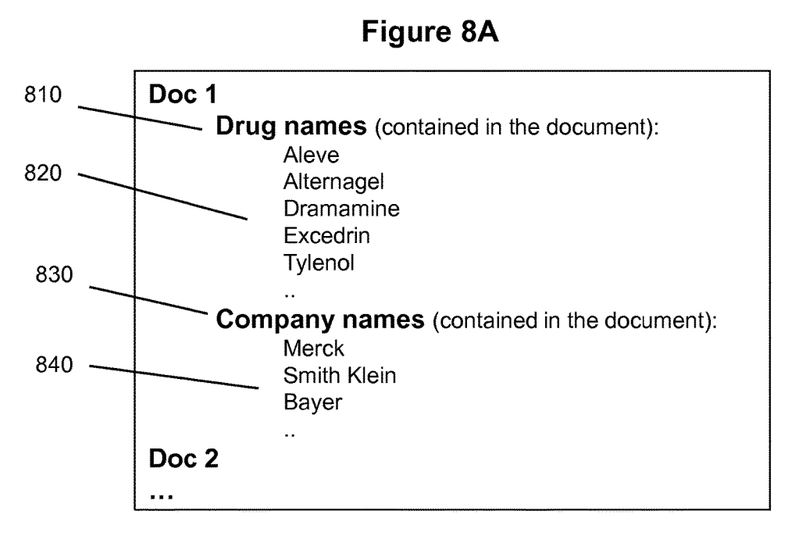
FIGS. 8A and 8B illustrate examples of displaying terms extracted from the content based on predefined semantic attributes or attribute values.

FIG. 8A illustrates an example of such information extraction and display. In FIG. 8A, the name of the semantic attributes "drug name" (810) is displayed, underneath the attribute name, terms that are drug names (820) in the source text are automatically identified and extracted using the methods described in the present and referenced disclosures, and displayed in a list format in a display area underneath the file or document name or icon in a file management tool's user interface. Another semantic attribute of "company name" (830) is also displayed, and underneath the attribute name, terms that are company names (840) in the source text are identified and extracted, and displayed in a list format in a display area.

This type of display of information about the attribute-instances or class-members relationships can provide a convenient way for users to quickly know the key information contained in the document, and can help users quickly find the exact document that is needed among a long list of documents.

Such information can also be displayed in other display areas or in other display formats as described above.

The effect of the display methods provided in the present invention can be more apparent when there are a large number of files or documents or their names or icons concurrently displayed in a folder or a window or other single viewing area, in which case finding a particular document can be difficult, but with the methods of the present invention, the task of finding a particular document among many candidates in a long list can be much easier.

In some embodiments, the names of semantic attributes and location of documents that contain instances of terms of the corresponding semantic attributes can be integrated into a search index, such that, the search tool can enable features such as "search documents containing drug names", or "search documents containing phone numbers", or "search documents containing positive comments", etc. While conventional search interface is limited to allowing users to only enter a search query as keywords, with the present invention, options such as a dropdown list, or other forms, can be used to allow the user to preview what semantic attributes are available and searchable in the index, and to search with such parameters, in addition to conventional keyword-based search. Such features can also be integrated into the embodiments for displaying the topics of a document collection without requiring the user to enter any text in the query box, as described above.

Displaying Information about Topic-Attributes for Semantic Attributes Associated with a Topic Term In addition to the above example of displaying a list of terms under the heading of a semantic attribute such as "drug names", in some embodiments, the heading can be a term representing a topic or concept or object, while the list of terms under the heading can be names or descriptions of different semantic attributes or attribute values associated with the topic term, but such names or descriptions are not necessarily the exact terms extracted from the text content that contain the topic term.

For example, in a document such as a resume or job description, a position or skill name such as "quality assurance" can have different attributes or attribute values for a given person or for different persons. For example, a person may have worked in quality assurance for 3 years, either in the capacity of a project lead, or a director, or as an engineer, etc. The attributes such as duration, role or position, etc., are the different semantic attributes associated with the term "quality assurance", and "3 years", "project lead", or "engineer" can be treated as values of the attributes. Their attributes or attribute values may not be the exact terms that occur with the topic name of "quality assurance". The duration of "3 years" may be calculated from the person's resume using the starting and ending dates of a section in the employment history. The role or capacity of "project lead" may be inferred from a description of the roles the person played before, etc.

Furthermore, when multiple resumes are processed, the topic term of "quality assurance" may appear in multiple resumes and each with a different semantic attribute or a different value associated with the topic. One way to effectively organize and present such information in the multiple documents is to identify such semantic attributes and values and represent them with terms as names or descriptions of such attributes or values. For example, if one resume states that person A worked as a quality assurance engineer between January 2001 to December 2003, it can be inferred or calculated from the starting and ending dates that the person worked as an engineer in quality assurance for 3 years. If another resume states that person B worked as a quality assurance in the capacity of a project lead between January 2001 and December 2004, it can be inferred or calculated from the starting and ending dates that the person worked as a project lead in quality assurance for 4 years.

In such cases, even though the exact terms such as "3 year", "4 year", or "project lead" or "engineer" may not appear in the documents, the related information can be obtained from the documents as unstructured data, and can be used as names or descriptions of the semantic attributes or values associated with the topic term "quality assurance", and can then be gathered and displayed in the form of the topic-comment hierarchy as described above.

Figure 8B:
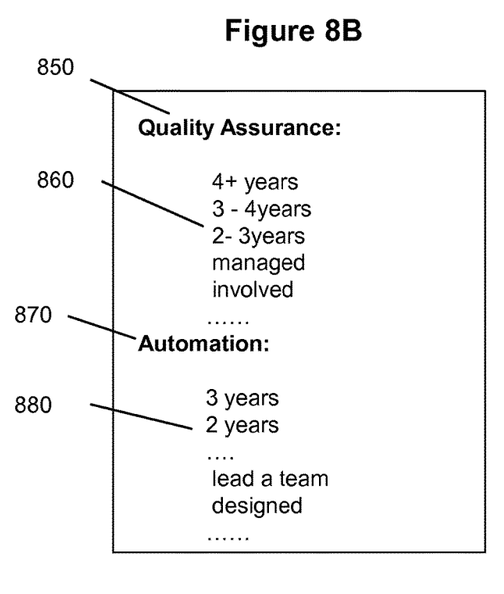

FIG. 8B is an example of such a topic-attribute hierarchical display as a means for effectively organizing and presenting the information extracted from unstructured data sources. In FIG. 8B, topic terms (850, 870) are extracted from the documents, and semantic attributes or values (860, 880) associated with such topic terms are displayed in the topic-comment hierarchy as described above.

The above is only an example with a specific case of a resume document showing how semantic attributes or values can be gathered and displayed in the context of a topic term. In addition to this example, other types of semantic attributes or attribute values in other types of documents can include attributes such as duration, distance, size, shape, color, scope, role, state, relation with other objects, intention, opinion, etc., as well as other contextual information, and the values of the attributes can be inferred from the information contained in the text content.

In some embodiments, a term importance score can further be calculated for the terms representing the attributes or values. The score can be based on the actual values of the attribute, such as the actual duration of an experience, or based on the frequency of occurrence of the attributes or values in the context of the topic term, etc. Furthermore, different visual effects can be applied to the terms, such as rank order in a list, and size, color or character style of the terms, and annotations, as described above with topic-comment embodiments.

Also as described above with topic-comments display formats, the topic-attributes information illustrated in FIG. 8B, as well as the attribute-instances or class-members information illustrated in FIG. 8A, can also be displayed in other formats, such as in a cloud format.

Displaying the Category or Class Information for Files or Documents

In U.S. Pat. No. 8,370,129, entitled "System and Methods for Quantitative Assessment of Information in Natural Language Contents", and U.S. patent application Ser. No. 13/655,415 entitled "System and Methods for Determining Relevance between Text Contents", system and methods are disclosed for classifying documents using a conceptual association dataset. In U.S. patent application Ser. No. 13/732,374 entitled "System and Methods for Quantitative Assessment of Information in Natural Language Contents and for Determining Relevance Using Association Data", system and methods are disclosed for classifying documents using other methods in addition to the conceptual association dataset. The disclosures of which are herein incorporated by reference. When a document is identified as belonging to a predefined class or category, such information can also be displayed in a file management tool's user interface, or an email interface for easy access to the relevant document among a long list of other documents or emails, in a way similar to a tagging or summary function.

In U.S. Pat. No. 8,407,217 entitled "Automated Topic Discovery in Documents", and U.S. patent application Ser. No. 13/707,940 entitled "Automated Topic Discovery in Documents and Content Categorization", system and methods are disclosed for displaying topic or summary information in a column format that is typically seen in a file management tool, such as Windows Explorer, or many cloud-based file sharing and management tools, as well as in other formats such as a word-cloud format, etc. In the referenced disclosures, what is displayed is usually terms extracted from the document contents, representing the important information contained in the documents. In the present invention, the terms that are not necessarily contained in the original document, but can represent the class or category of the document can also be displayed in connection to the document objects in the user interface for easy access to such information.

In some embodiments, a classifying process, or a classifier, is first used to determine the name of a class or category of which the document can be a member. The name of the class or category associated with the document object is then displayed in an area in the user interface connected to the document object, such as the name or an icon of the document. This type of display is especially effective in a multiple document list view format or group view format of a file management tool's user interface, or email interface.

Figure 9A:
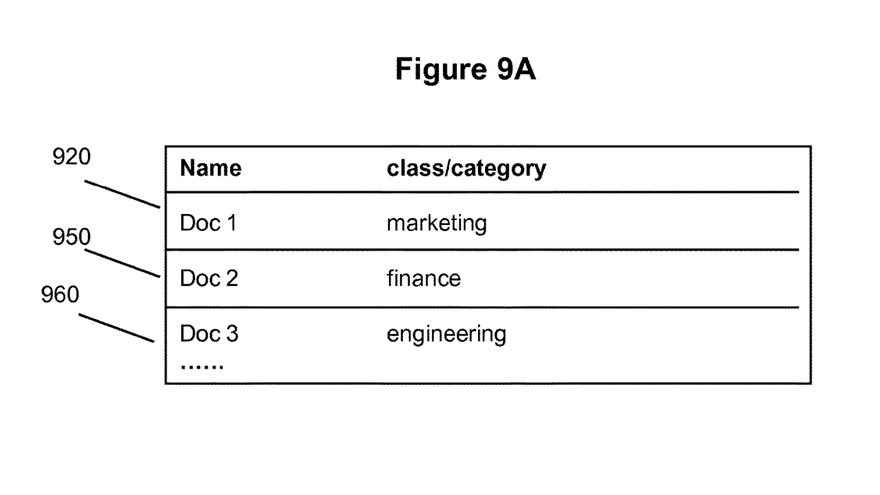
FIG. 9A is an exemplar case of displaying class or category information attached to a document.

FIG. 9A is an illustration of an exemplar case where such class or category information is automatically displayed for one or more documents in the file management tool's user interface. In FIG. 9A, a document (920) is identified as belonging to a category named "marketing"; and another document (950) is identified as belonging to a category named "finance"; and another document (960) is identified as belonging to a category named "engineering".

Figure 9B:
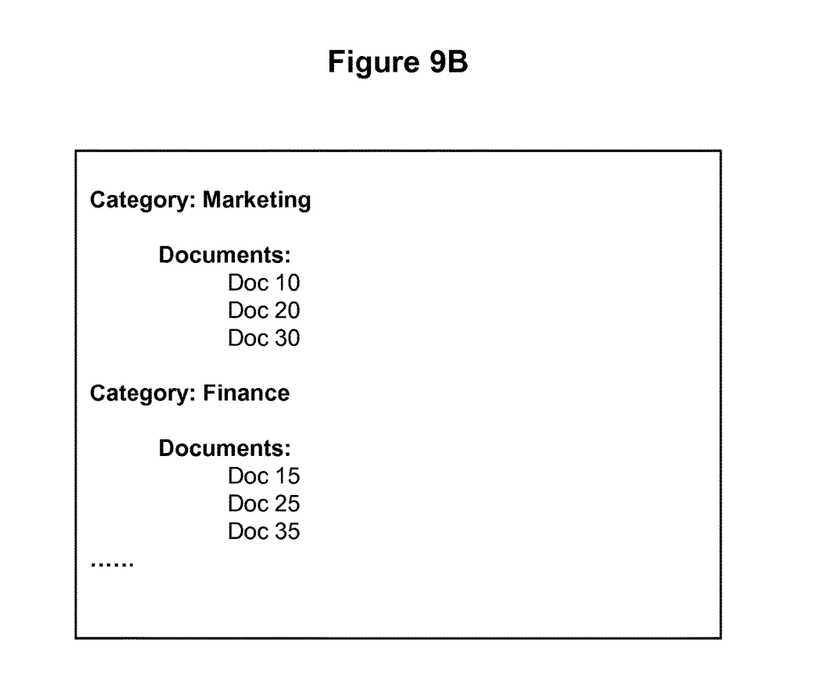
FIG. 9B shows an example of displaying document objects by sorting or grouping by classes or categories.

A conventional system would require the user to manually enter such information into these fields. In the present invention, once the class membership information is obtained through an automatic classification process, either using a local processor, or a remote processor, the result can also be automatically displayed in various formats. FIG. 9A shows one example in a column format, and FIG. 9B shows another example in a group format, while the same information can also be displayed in other formats as described above.

In some embodiments, especially when a document can be classified into two or more classes or categories, the system of the present invention can display the candidate class/categories names as suggestions and allow the user select one or more names for display. In some embodiments, the system can allow the user to edit the automatically generated class or category names, or edit the name of the document based on the class or category names.

With such class or category information, documents displayed in the exemplar file management tool's user interface can be sorted by class or category. In some other embodiments, documents can be first grouped by their class or category membership, and then displayed in groups. This way, users can easily find the documents by their class, rather than by searching through a long list one by one.

Displaying the Overall Sentiment Value for Files or Documents

In U.S. patent application Ser. No. 13/709,827 entitled "System, Methods and User Interface for Discovering and Presenting Information in Text Content", and U.S. patent application Ser. No. 13/794,800 entitled "System, Methods and User Interface for Identifying and Presenting Sentiment Information", system and methods are disclosed for identifying the sentiment type or value of sentences contained in the document, the disclosures of which are herein incorporated by reference. An overall sentiment value conveyed in the content of a document can also be obtained by summing up the sentiment measurements of each sentence in the document. In the present invention, the overall sentiment type or value associated with a document can also be displayed in a similar way as the class or category information is displayed as described above. For example, a document object that is displayed in a file management tool's user interface can be labeled as being positive, negative, or neutral, or in some another embodiments, can be labeled as "strong positive", "medium positive", "weak positive"; or "strong negative", "medium negative", "weak negative", etc., or in a numerical value format such as 5, 3, 1, or 0, or −1, −3, −5, etc., to indicate the degree of sentiment on either the positive or negative scale. In general, some label of the sentiment type of the document is provided.

Figure 10A:
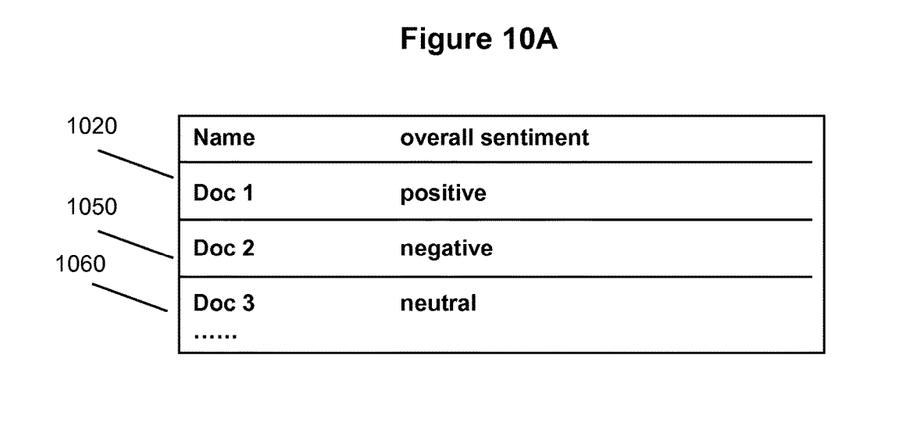
FIG. 10A is an example of labeling document objects with sentiment type in a file management tool's user interface.

FIG. 10A is an example of labeling the document in a file manager tool's user interface with sentiment type.

Similar to the case with class or category as described above, document objects such as names or icons in the user interface can be sorted or grouped by the value of the sentiment measures associated with each document. This way, users can easily find the documents by their sentiment type, rather than searching through a long list one by one.

Figure 10B:
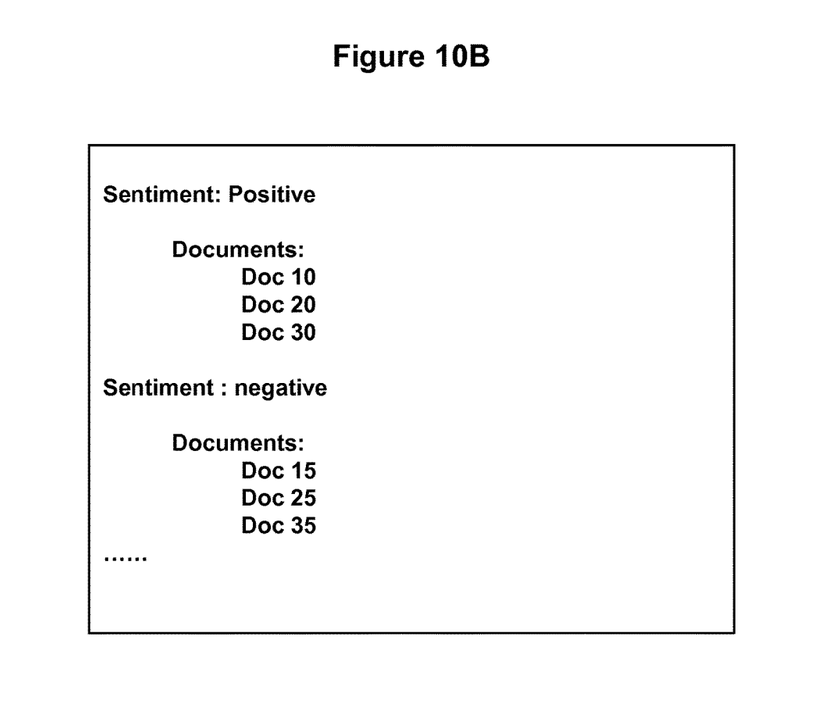
FIG. 10B is an example of displaying document objects by sorting or grouping based on sentiment types.

FIG. 10B shows an example of displaying the documents by sorting or grouping based on sentiment types.

Applying Visual Effects to Indicate Different Attributes of Files or Documents

The various display methods of the present invention as described above distinguish themselves from conventional approaches in that they obtain useful information or attributes about the documents, based on either grammatical, or semantic, or contextual analysis of the document contents, and display such information in a way similar to the way other metadata are displayed, to further aid the users to quickly and easily find the document they are looking for, without having to go through a long list of candidates.

The above display formats can be further enhanced by applying different visual effects to the document object in a file management tool's user interface, such as the name or icons of the documents, or emails, based on the specific information or attributes obtained using the above methods.

For example, in the display area of the user interface, documents or emails of the same class can be highlighted with the same color, or be associated with an icon representing a specific class for easy recognition. This can have either the same effect, or a complementary effect of sorting or grouping by class or category.

The method of applying a special visual effect can also be used with the attribute of sentiment type or value associated with each document. For example, in a file management tool's user interface or an email interface, a document or email that is associated with an overall positive sentiment can be highlighted using a special color to distinguish documents or emails that have an overall positive sentiment from documents that have an overall negative sentiment, or different colors can be used to highlight documents of different degrees of overall sentiment values such as "strong positive, "weak positive", etc., to further distinguish documents having similar attributes from other documents.

Furthermore, as described above, documents having certain semantic attributes, such as containing terms that are drug names, or company names, or phone numbers, product names, etc., can be highlighted in different colors or associated with different icons to make it easier for the user to quickly recognize and locate the needed document among a long list of candidates.

In U.S. patent application Ser. No. 13/844,143, entitled "Systems, Methods, and User Interface for Effectively Presenting Information", methods for highlighting documents using different visual effects based on attributes associated with the documents are disclosed. The disclosures of which are herein incorporated by reference. The present invention further extends application scope of such methods to the use cases as described above with various attributes obtained from the document contents as user-generated contents in contrast to system-generated metadata, and as unstructured data in contrast to the structured data that reside in a database.

The above are only examples of the present invention. The system, methods, and user interface illustrated with the specific examples are equally applicable to other types of documents or text objects, such as proposals, reports, articles, etc., and can be applied to other areas or domains without deviating from the principle spirit of the present invention.

What is claimed is:

1. A computer-implemented method for processing information in a closed document residing on a computer file system, comprising:

displaying, in a computer file system user interface, a name or icon of an electronic file, wherein the electronic file is in a closed state, wherein the electronic file is an object in the computer file system, wherein the computer file system comprises one or more folders or subfolders and at least one file in a tree structure;

allowing a user to act on the name or icon of the electronic file, or on a user interface object associated with the name or icon of the electronic file, wherein the user action comprises moving a pointing device over, clicking, or touching, or a voice or visually activated action;

in response to a user action, receiving a first term and a second term extracted from a text content associated with the electronic file;

determining a two-part display format that represents a hierarchical relation between the first term and the second term, wherein the two-part display format comprises a first part and a second part;

displaying the first term in the first part; and displaying the second term in the second part, wherein the second term is displayed as an item subordinate to the first term in the hierarchical format, wherein the subordinate relationship is defined by a visual format including a heading-body relation, or a difference in size, color or character style, or position, or annotation, wherein the first term and the second term are obtained by:

(a) receiving a user-generated text content in the electronic file, (b) tokenizing the text content into terms, each term comprising a word or a phrase or a sentence, (c) identifying a first term in the text content, (d) identifying an attribute associated the first term using a machine-based algorithm, wherein the attribute comprises a grammatical, semantic, positional, or frequency attribute, (e) assigning an importance measure to the first term based on the attribute, (f) selecting the first term for extraction if the importance measure is above a threshold, (g) identifying a sentence containing the first term and the second term, (h) identifying a grammatical structure in the sentence, wherein the grammatical structure comprises components and one or more types of relations between the components, wherein the components and relations comprise a grammatical subject in relation to a non-subject portion of the sentence, or a multi-word phrase comprising a head term in relation to a modifier term, (i) determining the first term and the second term as two components in one of the one or more types of relations in the grammatical structure, and (j) extracting the first term and the second term based on the type of relation.

2. The method of claim 1, wherein the type of relation is that the first term is a grammatical subject of the sentence and the second term is not contained in the grammatical subject of the sentence; or the first term and the second term are in a multi-word phrase comprising a head term and a modifier term, wherein the first term is the head term of the multi-word phrase and the second term is the modifier term in the multi-word phrase; or the first term is part of a predicate of the sentence and the second term is a multi-word phrase containing the first term, or wherein the first term is a grammatical subject of the sentence and the second term includes the sentence.

3. The method of claim 1, wherein multiple second terms are extracted from the text content, wherein the first term is displayed as a heading and the multiple second terms are displayed as a list of elements under the heading, or displayed as elements in a cloud or group format under the heading represented by the first term.

4. The method of claim 1, further comprising:
calculating a term importance score for the second term based on the number of the text units containing the first term and the second term, or based on the grammatical attributes associated with the second term; and
displaying the second term in a visual format based on the term importance scores, wherein the visual format includes a rank order in a list, or the size, color or character style of the second term, and its position or annotation.

5. The method of claim 1, further comprising:
linking the first term or the second term to a text unit from which the first term or the second term is extracted; and
displaying the text unit when the link is acted upon.

6. A computer-implemented method for processing information in a closed document residing on a computer file system, comprising:
displaying, by a computing device, a first user interface object associated with or comprising a name or icon of an electronic file, wherein the electronic file is in a closed state, wherein the electronic file is an object in a computer file system, wherein the name or icon of the electronic file is a node in a computer file system hierarchy, wherein the computer file system comprises one or more folders or subfolders and at least one file in a tree structure, wherein the folders or subfolders are non-terminal nodes in the tree structure;
enabling the first user interface object to respond to a user action;
receiving a user action on the first user interface object, wherein the action comprises moving a pointing device over the first user interface object, clicking, or touching on the first user interface object, or a voice or visually activated action;
in response to the user action, changing the first user interface object to a non-terminal node in the file system hierarchy if the first user interface object is a terminal node in the file system hierarchy;
creating a lower-level node under the non-terminal node in the file system hierarchy, wherein the lower-level node comprises at least a first display area associated with the first user interface object;
obtaining a first term automatically extracted by a machine from the content in the electronic file, wherein the first term comprises a word or a phrase; and
displaying the first term in the first display area,
wherein the first term is obtained by:
(a) tokenizing the text content of the electronic file into terms, each term comprising a word or a phrase or a sentence,
(b) identifying a first term in the text content, (c) identifying an attribute associated the first term using a machine-based algorithm, wherein the attribute comprises a grammatical, semantic, positional, or frequency attribute, (d) assigning an importance measure to the first term based on the attribute, and (e) extracting the first term from the text content if the importance measure is above a threshold.

7. The method of claim 6, further comprising:
enabling the first term to be a non-terminal node in the file system hierarchy, or displaying a second user interface object associated with the first term as a non-terminal node in the file system hierarchy; and
allowing a user to act on the first term or the second user interface object.

8. The method of claim 7, further comprising:
in response to a user action on the first term or the second user interface object, displaying a second display area associated with the first term, and a second term extracted from the content associated with the electronic file, wherein the second term comprises a word or a phrase, wherein the second term constitutes a lower-level node under the first term in the file system hierarchy.

9. The method of claim 6, wherein the first term is extracted based on a grammatical attribute associated with the first term, or based on a semantic attribute associated with the first term.

10. The method of claim 9, wherein the grammatical attribute includes parts of speech and grammatical roles of at least a subject, a predicate, a sub-phrase of a multi-word phrase, a modifier in a multi-word phrase, a head of a multi-word phrase, a direct or indirect object, a predicative, a complement, wherein the semantic attribute includes at least an action, a thing or a person, an agent of an action, a recipient of an action or a thing, a state or status of an object, a mental or physical state of a person, a positive or negative opinion, a name of product or service or an organization.

11. The method of claim 9, wherein the first term is in a text unit containing the second term, wherein the second term is extracted from the text unit based on a grammatical relationship between the first term and the second term, wherein the grammatical relationship includes:

the first term being a grammatical subject of the sentence and the second term not being contained in the grammatical subject of the sentence; or the first term and the second term being in a multi-word phrase comprising a head term and a modifier term, wherein the first term is the head term of the multi-word phrase and the second term is the modifier term in the multi-word phrase; or the first term being part of a predicate of the sentence and the second term being a multi-word phrase containing the first term, or the first term being a grammatical subject of the sentence and the second term including the sentence.

12. The method of claim 6, further comprising:
linking the first term to a text unit where the first term is extracted from, and
displaying the text unit when the link is acted upon.

* * * * *